United States Patent
Chu et al.

(10) Patent No.: US 9,544,847 B2
(45) Date of Patent: Jan. 10, 2017

(54) POWER EFFICIENT PS-POLL

(71) Applicant: STMicroelectronics, Inc., Coppell, TX (US)

(72) Inventors: Liwen Chu, San Ramon, CA (US); George A. Vlantis, Sunnyvale, CA (US)

(73) Assignee: STMICROELECTRONICS, INC., Coppell, TX (US)

( * ) Notice: Subject to any disclaimer, the term of this patent is extended or adjusted under 35 U.S.C. 154(b) by 0 days.

(21) Appl. No.: 15/213,107

(22) Filed: Jul. 18, 2016

(65) Prior Publication Data

US 2016/0330683 A1 Nov. 10, 2016

Related U.S. Application Data (62) Division of application No. 13/685,341, filed on Nov. 26, 2012.

(60) Provisional application No. 61/676,196, filed on Jul. 26, 2012, provisional application No. 61/676,201, filed on Jul. 26, 2012, provisional application No. 61/676,173, filed on Jul. 26, 2012.

(51) Int. Cl.
| | |
|---|---|
| *H04W 52/02* | (2009.01) |
| *H04W 8/22* | (2009.01) |
| *H04W 84/12* | (2009.01) |
| *H04W 88/08* | (2009.01) |

(52) U.S. Cl.
CPC ......... *H04W 52/0209* (2013.01); *H04W 8/22* (2013.01); *H04W 52/0206* (2013.01); *H04W 52/0216* (2013.01); *H04W 52/0229* (2013.01); *H04W 84/12* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 8,547,853 | B2 | 10/2013 | Du et al. |
| 8,634,336 | B2 | 1/2014 | Kang et al. |
| 2007/0211727 | A1 | 9/2007 | Sethi et al. |
| 2010/0040033 | A1 | 2/2010 | Xhafa et al. |
| 2011/0122780 | A1 | 5/2011 | Nieminen et al. |
| 2012/0275362 | A1 | 11/2012 | Park et al. |

OTHER PUBLICATIONS

Wentink et al., "Low Power Medium Access", IEEE 802.11-12-/0114r0, Jan. 16, 2016.*

(Continued)

*Primary Examiner* — Joseph Bednash
(74) *Attorney, Agent, or Firm* — Seed IP Law Group LLP (57) ABSTRACT

A IEEE 802.11 Wireless Local Area Network (WLAN) system of an access point (AP) and one or more stations (STAs) reduces power consumption and increases battery life of power efficient low power STAs by decreasing the amount of time that a power efficient low power STA remains in an awake state. After indicating power efficient low power operation during association with an AP supporting such operation, the power efficient low power STA may enter the doze state from the time that the power efficient low power STA sends a PS-Poll until the power efficient low power STA receives the buffered DATA frame from the AP. While implementing the power efficient PS-Poll method, the AP can send the buffered DATA frame to the STA SIFS after the AP sends an ACK to the received PS-Poll from the STA.

28 Claims, 6 Drawing Sheets

(56) References Cited

OTHER PUBLICATIONS

Wong et al., "PS-Poll for Downlink Bufferable Units", IEEE 11-12/1329r0, Nov. 12, 2012.*
Koskela et al., "802.11ah Channel Access Enhancement", IEEE 802.11-12/0877r0, Jan. 16, 2016.*
Doppler et al. "PS-Poll Immediate ACK Enhancements", IEEE 802.11-12/0327r0, Mar. 12, 2012.*
Chu et al., "Power Efficient PS Poll", IEEE 802.11-12/034r1, Mar. 2, 2012.*
802.11 Working Group of the 802 Committee, "Draft Standard for Information Technology—Telecommunications and information exchange between systems—Local and metropolitan area networks—Specific requirements, Part 11: Wireless LAN Medium Access Control (MAC) and Physical Layer (PHY) specifications, Amendment 4: Enhancements for Very High Throughput for Operation in Bands below 6 GHz," *IEEE P802.11ac-D2.0*, Jan. 2012, 359 pages.
Calcev et al., "Non-TIM Stations in 1 1ah," *IEEE 11-12-0610-00-00ah*, May 2012, 11 pages.
IEEE Computer Society, "IEEE Standard for Information technology—Telecommunications and information exchange between systems—Local and metropolitan area networks—Specific requirements, Part 11: Wireless LAN Medium Access Control (MAZ) and Physical Layer (PHY) Specifications," *IEEE Std 802.11™-2007 (Revision of IEEE Std 802.11-1999)*, Jun. 12, 2007, 19 pages.
Koskela et al., "802.11ah Channel Access Enhancement," *IEEE 802.11-12/0877r0*, Jan. 16, 2012, 9 pages.
Park et al., "Uplink Channel Access," *IEEE 802.11-12/0606r0*, May 14, 2012, 20 pages.
Sandhya et al., "DL MU TXOP Power Save," *IEEE 80211-10/1302r0*, Nov. 8, 2010, 15 pages.
Sandhya et al., "Downlink TWOP Power Save," *IEEE 802.11-11/0091r0*, Jan. 17, 2011, 9 pages.
Wentink et al., "Low Power Medium Access," *IEEE 802.11-12/0114r0*, Jan. 16, 2012, 13 pages.
Wong et al., "PS-Poll for Downlink Bufferable Units," *IEEE 11-12/1329r0*, Nov. 12, 2012, 15 pages.
Zheng et al., "Channel Access Supporting Low Power Operation," *IEEE 802.11-12/0409r6*, Jul. 12, 2012, 13 pages.

* cited by examiner

POWER EFFICIENT PS-POLL

The present application is a divisional of U.S. patent application Ser. No. 13/685,341, entitled "POWER EFFICIENT PS-POLL" and filed on Nov. 26, 2012, which is incorporated herewith in its entirety. The present application also incorporates by reference the subject matter of: U.S. Non-Provisional application Ser. No. 13/685,341 entitled "POWER EFFICIENT PS-POLL" and filed on Nov. 26, 2012; U.S. Provisional Patent Application Ser. No. 61/676,196 entitled "POWER EFFICIENT PS-POLL" and filed on Jul. 26, 2012; U.S. Provisional Patent Application Ser. No. 61/676,201 entitled "SLOT-BASED POWER SAVE IMPROVEMENT" and filed on Jul. 26, 2012; and U.S. Provisional Patent Application Ser. No. 61/676,173 entitled "SLOT-BASED POWER SAVE WITHOUT PS-POLL" and filed on Jul. 26, 2012.

BACKGROUND

Devices using Institute for Electrical and Electronic Engineers (IEEE) 802.11 and/or Wireless Local Area Network (WLAN) connectivity for Internet access are frequently either battery-powered or otherwise benefit from minimizing power consumption, particularly when not being utilized. For example, IEEE 802.11ah is considered suitable for use for sensor applications, such as a smart grid application, in which the stations are battery powered and should work for a long time without replacement of the battery. The Distributed Coordination Function (DCF) of IEEE 802.11 provides a power saving mechanism (PSM) allowing nodes to remain silent in a sleep state. However, various issues can cause actual use of the PSM to unnecessarily consume power.

There is, therefore, a need in the art for alternative power save mechanisms in using wireless network connections.

SUMMARY

Various disclosed embodiments relate to Wireless Local Area Network (WLAN) systems and methods for implementing a power efficient PS-Poll method. According to the present disclosure, a power efficient low power station is associated with an access point to form a basic service set. The power efficient low power station and the access point (AP) are configured to implement a power efficient PS-Poll method. While implementing the power efficient PS-Poll method, the AP indicates in the responding acknowledge (ACK) frame to a PS-Poll from a power efficient low power station whether the AP will delay the buffered DATA transmission after the responding ACK. While implementing the power efficient PS-Poll method, the AP can send the buffered DATA frame to the power efficient low power station SIFS after the AP sends ACK to the received PS-Poll from a low power station. While implementing the power efficient PS-Poll method, the power efficient low power station is allowed to enter a doze state in the time between the time that the power efficient low power station transmits the PS-Poll and the time that the power efficient low power station received the buffered DATA frame from the AP. When the AP and the station implement the power efficient PS-Poll method, the AP and the STA may also need to implement a transmission opportunity (TXOP) power save method.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same.

It should be noted that the functionality associated with any particular controller might be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system.

Figure 1:
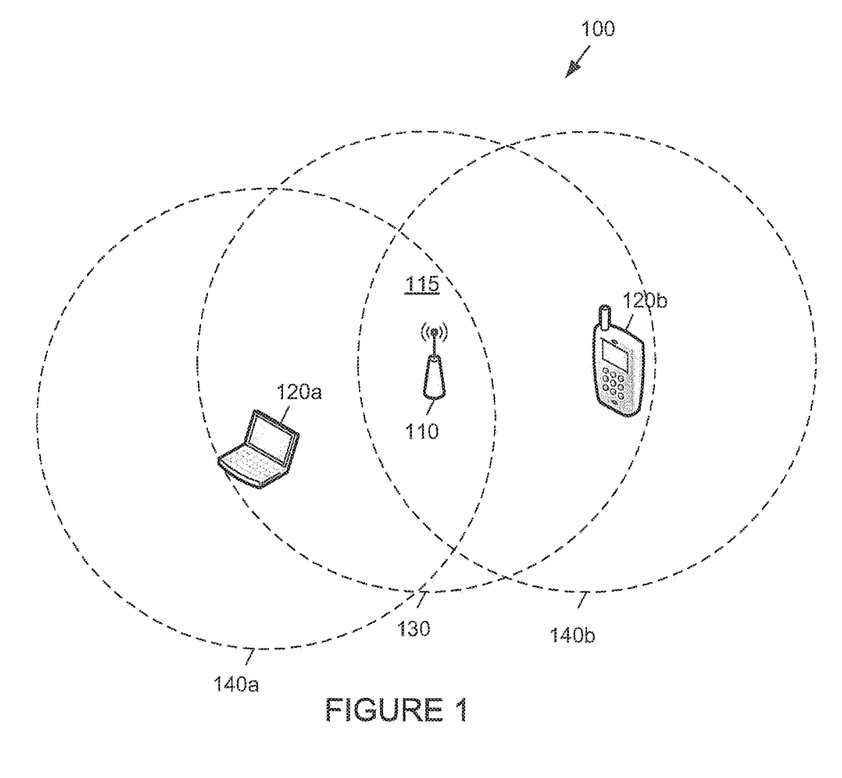
FIG. 1 depicts a wireless local area network (WLAN) environment in which power efficient power save poll (PS-Poll) stations in accordance with various embodiments of the present disclosure are implemented.

FIG. 1 illustrates a wireless local area network (WLAN) environment in which power efficient PS-Poll in accordance with various embodiments of the present disclosure are implemented. WLAN environment 100 includes a basic service set (BSS) 115 of an IEEE 802.11 wireless local area network. WLAN environment may be implemented, for example, in accordance with IEEE P802.11ac/D2.0, Draft STANDARD for Information Technology-Telecommunications and information exchange between systems-Local and metropolitan area networks-Specific requirements Part 11: Wireless LAN Medium Access Control (MAC) and Physical Layer (PHY) specifications Amendment 4: Enhancements for Very High Throughput for Operations in Bands below 6 GHz, the content of which is incorporated herein by reference. The BSS 115 includes, in the simplistic example shown, an access point (AP) 110 that is connected to the Internet (not shown) and a plurality of stations (STAs, also called "nodes" or "clients") 120a and 120b located within coverage area 130 of AP 110. STAs 120a and 120b are visible to the AP 110 and can communicate with the AP 110. The reception area 140a is the coverage area of STA 120a, and reception area 140b is the coverage area of STA 120b.

Although certain details will be provided with reference to the components of the access point 110 and the STAs 120 and 120b (singly, "WiFi device"), it should be understood that other embodiments may include more, less, or different components. A WiFi device includes electrical processing circuitry, a transmitter, and a receiver. In certain embodiments, the WiFi device includes a transceiver. The processing circuitry performs the functions of the WiFi device, with aid from the other components within the WiFi device. The processing circuitry includes a processor coupled to a memory and other components within the WiFi device. The memory includes any suitable volatile or non-volatile storage and retrieval device(s). For example, the memory can include any electronic, magnetic, electromagnetic, optical, electro-optical, electro-mechanical, or other physical device that can contain, store, communicate, propagate, or transmit information. The memory can store data and instructions for use by the processor.

PS-Poll Procedure

Figure 2A:
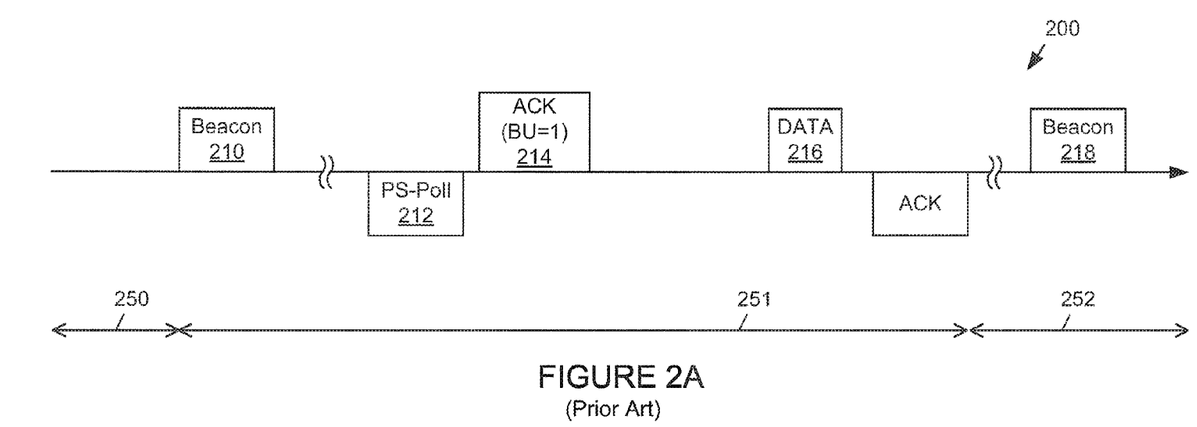
FIGS. 2A and 2B depict timelines for a portion of communications within a WLAN environment including PS-Poll stations operating a PS-Poll procedure.
Figure 2B:
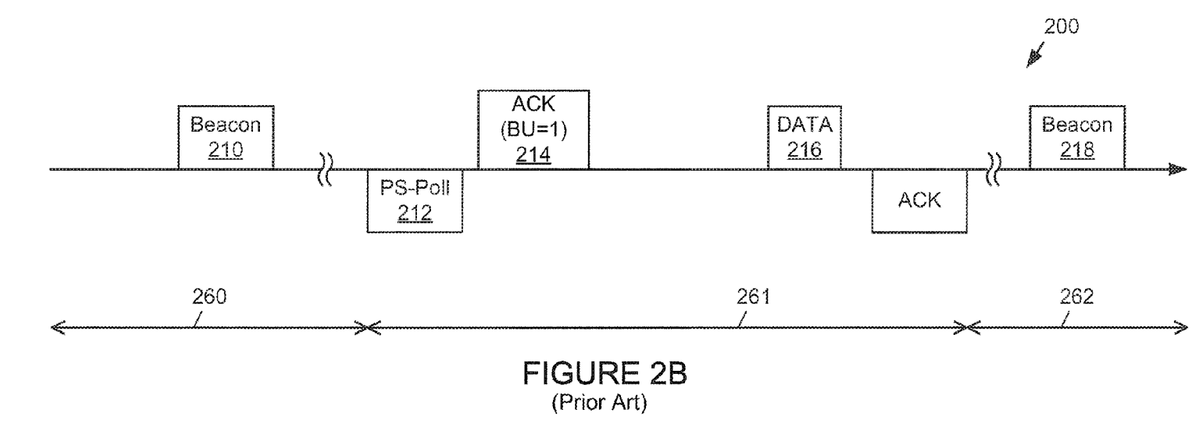

FIGS. 2A and 2B depict alternative timelines for a portion of communications employed during PS-Poll procedures. As illustrated by timelines 200 and 202, a STA 120a or 120b may "doze" or "sleep" in low power operation during an interval 250 or 260 prior to or after transmission of a BEACON 210 by the AP 110. When a STA 120 is in a Doze or Sleep state, the STA 120 cannot send or receive communication signals between the STA 120 and the access point 110. When a STA 120 is in an Awake state, the STA 120 is able to sense the communication channel between the STA 120 and the access point 110 and to send and receive communications. The STA 120a or 120b may wake up for the BEACON 210, then transmit PS-Poll frame 212, and then must stay awake during the subsequent interval 251 during which STA 120a or 120b transmits a PS-Poll frame 212, receives and acknowledgement (ACK) frame 214, and receives data 216. The STA 120a or 120b may transmit PS-Poll frame 212 without receiving the BEACON, and then must stay awake during the subsequent interval 261 during which STA 120a or 120b transmits a PS-Poll frame 212, receives and acknowledgement (ACK) frame 214, and receives data 216. As shown, the ACK 214 contains a traffic buffering (BU) bit set to a logical one (1), indicating that traffic for the STA is buffered as indicated in the traffic indication map (TIM) such that the STA must stay awake (i.e. a service period starts). The BU set to a logical zero (0) indicated that no traffic is buffered for the STA and the STA may go back to sleep. When traffic (for example, a buffered DATA frame) is present at the AP 110 for that STA, the traffic is said to be applicable to that STA, such as applicable buffered DATA.

Upon receiving the data 216 from the AP 110, the STA 120a or 120b transmits ACK to the AP 110 and then goes back to sleep for interval 252, which interval includes the occurrence of another BEACON 218 transmission. Once a power save STA 120a or 120b sends a PS-Poll frame 212, however, that STA 120a or 120b needs to keep awake until the next beacon or data frame from the AP 110. This increases the power consumption of a power save STA.

TXOP Power Save in 802.11ac

Figure 3:
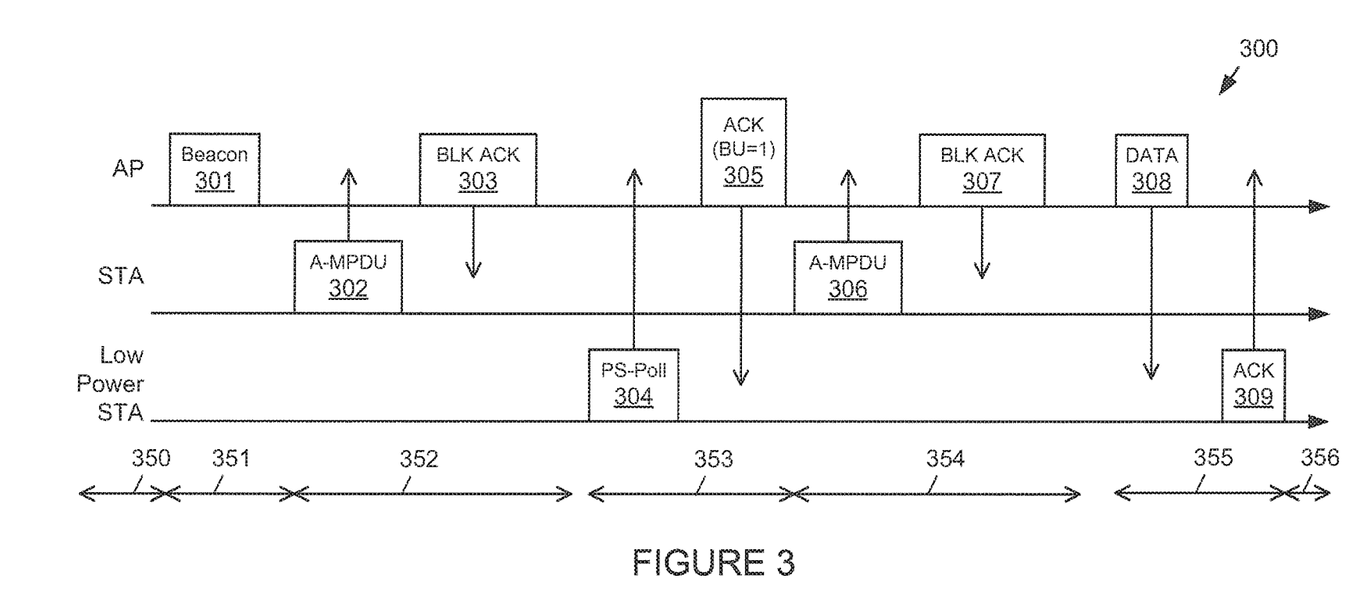
FIG. 3 depicts a timeline illustrating operation of a low power, power efficient PS-Poll, station in accordance with the present disclosure.

An AP 110 may indicate to the STAs 120a and 120b support for transmission opportunity (TXOP) power save operation (a power management scheme in which a STA may either be in the Awake or Doze state during a TXOP obtained by the AP for transmissions), and whether the AP 110 allows use of TXOP power save in a specific TXOP. In certain embodiments of the present disclosure, the indication of support for TXOP power save operation is included within a BEACON 301 frame. A TXOP power save STA 120a or 120b may go to Doze state if (a) the AP 110 allows the STA to use TXOP power save in a specific TXOP, and (b) a Physical Layer Convergence Protocol (PLCP) Protocol Data Unit (PPDU) scheduled for that specific TXOP is not intended for delivery to the STA.

Power Efficient Power Save PS-Poll

In a normal PS-Poll procedure, once a power save STA sends PS-Poll to an AP, the STA will need to keep active until a buffered DATA frame is received from the AP. If the AP cannot send the buffered DATA frame to the power save STA after receiving a PS-Poll, the AP just sends a responding ACK then sends the buffered DATA frame later. A power save STA will waste more power because of such operations. While implementing the power efficient PS-Poll method, the AP indicates in the responding ACK to a PS-Poll from a power efficient low power STA whether the AP will delay the buffered DATA transmission after the responding ACK. While implementing the power efficient PS-Poll method, the AP can send the buffered DATA frame to the power efficient low power STA SIFS after the AP sends ACK to the received PS-Poll from a power efficient low power STA. While implementing the power efficient PS-Poll method, the power efficient low power STA is allowed to go to doze state in the time period from the time that the power efficient low power station sends PS-Poll to the time that the power efficient low power STA receives the buffered DATA frame from the AP. When the AP and the STA implement the power efficient PS-Poll method, the AP and STA may also need to implement a TXOP power save method.

Power Efficient Power Save PS-Poll 1

FIG. 3 is a timeline illustrating operation of a power efficient PS-Poll low power STA in accordance with one embodiment of the present disclosure. An AP 110 indicates (via an information element within the BEACON 401, 461 or within the ACK 405, 463) whether the AP 110 supports power efficient low power STAs, and if so that AP 110 shall allow TXOP power save in all TXOPs during a period after at least a PS-Poll is received and before sending a buffered data frame to all power efficient low power STAs from which the AP 110 receives a PS-Poll. After a power efficient low power STA sends a PS-Poll, if the first PPDU does not include a Message Protocol Data Unit (MPDU) for that power efficient low power STA in a TXOP, the STA (having previously announced being a power efficient low power STA) can enter the Doze state in the TXOP.

Timeline 300 relates to AP 110, a non-low power STA, and a power efficient low-power STA, with the transmissions from the three nodes depicted separately for clarity and intervals during which the power efficient low power STA 120 enters different states identified. During the interval 350 prior to the AP 110 transmitting a BEACON 301, the power efficient low power STA 120 may be in the Doze state. The power efficient low power STA 120 wakes up during the interval 351 in which the BEACON 301 is transmitted, and until the start of transmission of an aggregated MPDU (A-MPDU) 302 by the non-low power STA to the AP 110. The power efficient low power STA 120 immediately enters a Doze state at the start of the A-MPDU 302 after determining that the A-MPDU is for another station through, e.g., information in the physical (PHY) signal. During the interval 352 following the start of transmission of the A-MPDU 302, including transmission of a Block ACK (BLK ACK) 303 from the AP 110 to the non-low power STA, the power efficient low power STA 120 returns to the Doze state. In certain embodiments, the BEACON frame includes a TIM IE that indicates the presence of buffered DATA frames and indicates the STAs to which the DATA frames are applicable. When a power efficient low power STA receives a TIM IE that indicates that none of the buffered traffic is applicable to that power efficient low power STA, the power efficient low power STA is in a Doze state throughout the remainder of the that Beacon interval.

The power efficient low power STA 120 wakes up again during the interval 353 in which the power efficient low power STA 120 transmits a PS-Poll 304 to the AP 110, and receives in return an ACK 305 with the BU set to 1. The power efficient low power STA 120 then re-enters the Doze state during a subsequent interval 354, during which the non-low power STA transmits another A-MPDU 306 to the AP 110 and receives a BLK ACK 307 from the AP 110. The power efficient low power STA 120 awakes again for the interval 355 during which the AP 110 transmits buffered data 308 to the power efficient low power STA 120 and during which the low power STA 120 transmits an ACK 309 to the AP 110, before returning once more to the DOZE state for the interval 356 following transmission of the ACK 309.

Power Efficient Power Save PS-Poll 2

Figure 4A:
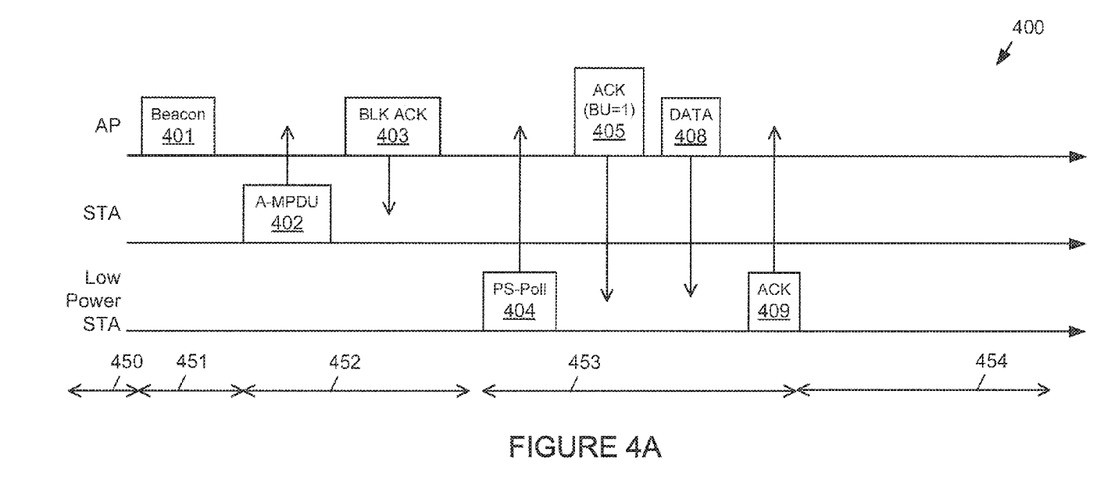
FIGS. 4A and 4B depict timelines illustrating operation of a low power, power efficient PS-Poll, station in accordance with the present disclosure.
Figure 4B:
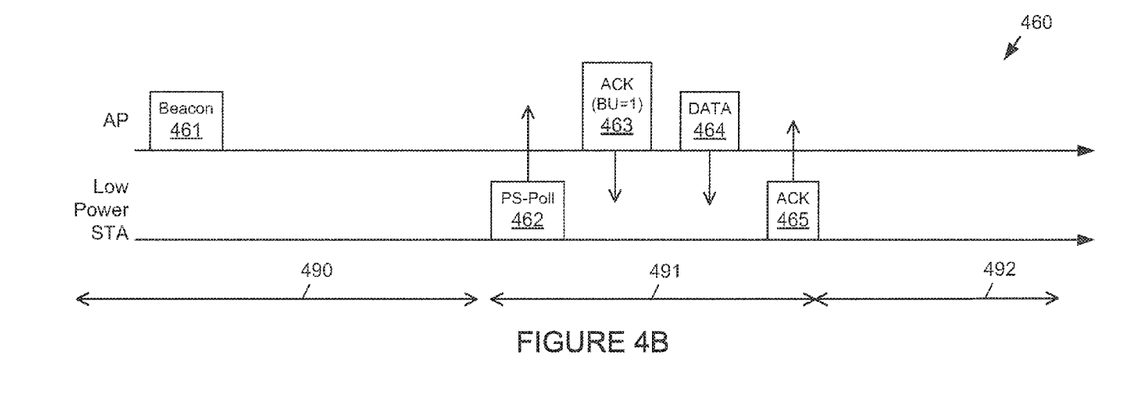

FIGS. 4A and 4B are timelines illustrating operation of a power efficient low power STA 120 power save PS-Poll in accordance with another embodiment of the present disclosure. Once again a power efficient low power STA 120 is defined, and an AP 110 can indicate whether the AP 110 supports power efficient low power STA 120. If so and the AP 110 receives a PS-Poll from a power efficient low power STA 120 that AP shall send a data frame to the power efficient low power STA 120 following either a SIFS or a Point Coordination Function (PCF) Inter-Frame Space (PIFS) after the AP transmits the ASK to acknowledge the PS-Poll from the power efficient low power STA 120.

Timeline 400 relates to AP 110, a non-low power STA, and a power efficient low-power STA 120, with the transmissions from the three nodes depicted separately for clarity and intervals during which the power efficient low power STA 120 enters different states identified. During the interval 450 prior to the AP 110 transmitting a BEACON 401, the power efficient low power STA 120 may be in the Doze state. The power efficient low power STA 120 wakes up during the interval 451 in which the BEACON 401 is transmitted, and until the start of transmission of A-MPDU 402 by the non-low power STA to the AP 110. During the interval 452 following the start of transmission of the A-MPDU 402, including transmission of BLK ACK 403 from the AP 110 to the non-low power STA, the power efficient low power STA 120 returns to the Doze state.

The power efficient low power STA 120 wakes up again during the interval 453 in which the power efficient low power STA 120 transmits a PS-Poll 404 to the AP 110, and receives in return an ACK 405 with the BU set to 1. The power efficient low power STA 120 remains awake during transmission, after a SIFS, by the AP 110 of buffered data 408 to the power efficient low power STA 120 and to transmit an ACK 409 to the AP 110. The power efficient low power STA 120 then returns once more to the DOZE state for the interval 454 following transmission of the ACK 409.

Timeline 460 relates to a similar series of transmissions involving AP 110 and a power efficient low power STA 120 only, without transmissions by a non-low power STA. During the interval 490 prior to the AP 110 transmitting a BEACON 461, the power efficient low power STA 120 may be in the Doze state and may remain in that state during transmission of BEACON 461 until shortly before the power efficient low power STA 120 transmits a PS-Poll 462 to the AP 110. The power efficient low power STA 120 then remains awake through the interval 491 during which an ACK 463 is received from the AP 110, buffered data 464 is transmitted by the AP 110 (after a SIFS), and an ACK 465 is transmitted to the AP 110 by the power efficient low power STA 120. The power efficient low power STA 120 then returns once more to the DOZE state for the interval 492 following transmission of the ACK 465.

Figure 5:
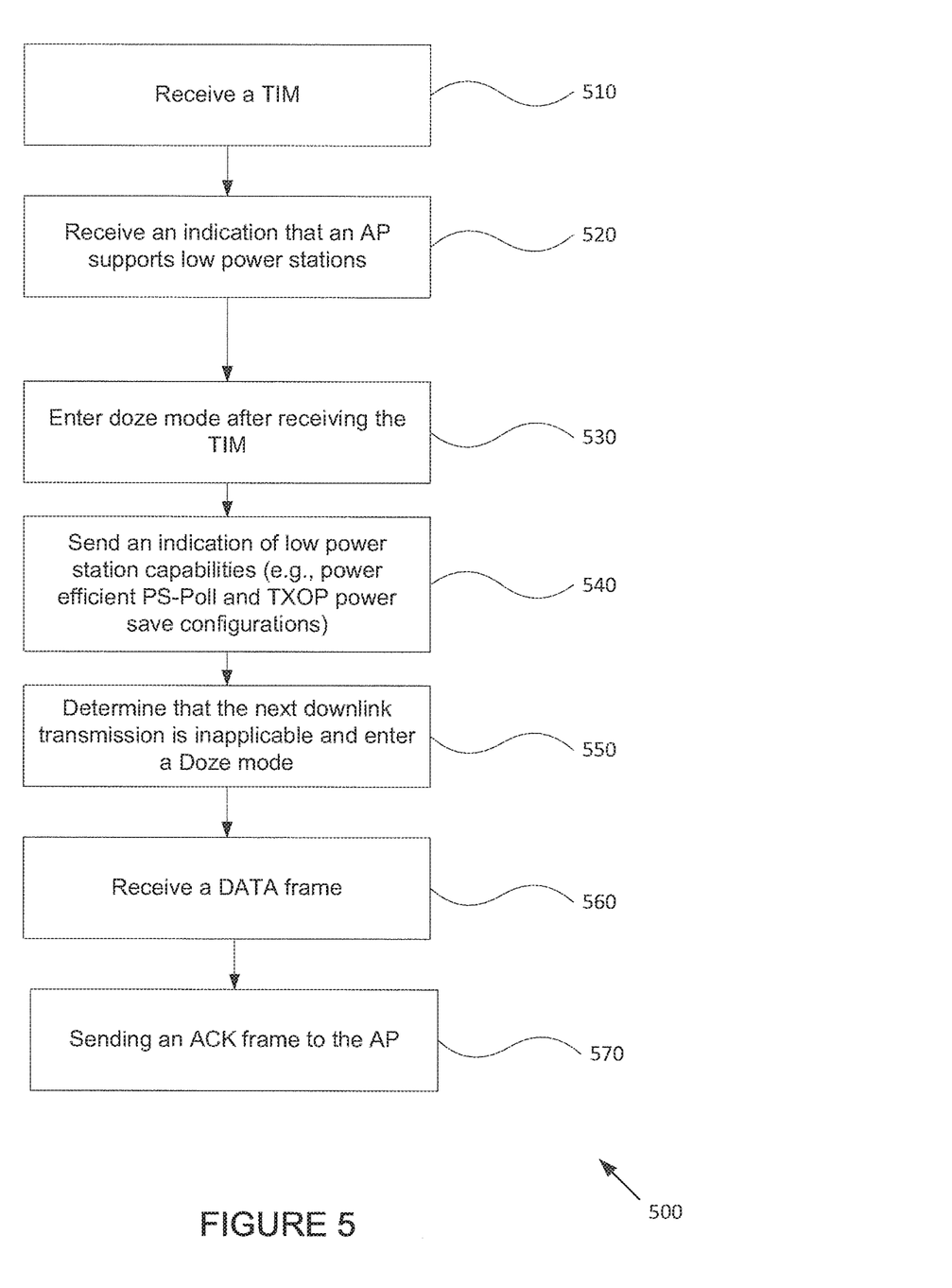
FIGS. 5 and 6 depict high level flow charts for processes performed within a WLAN environment including enhanced low power, power efficient PS-Poll, stations in accordance with various embodiments of the present disclosure.
Figure 6:
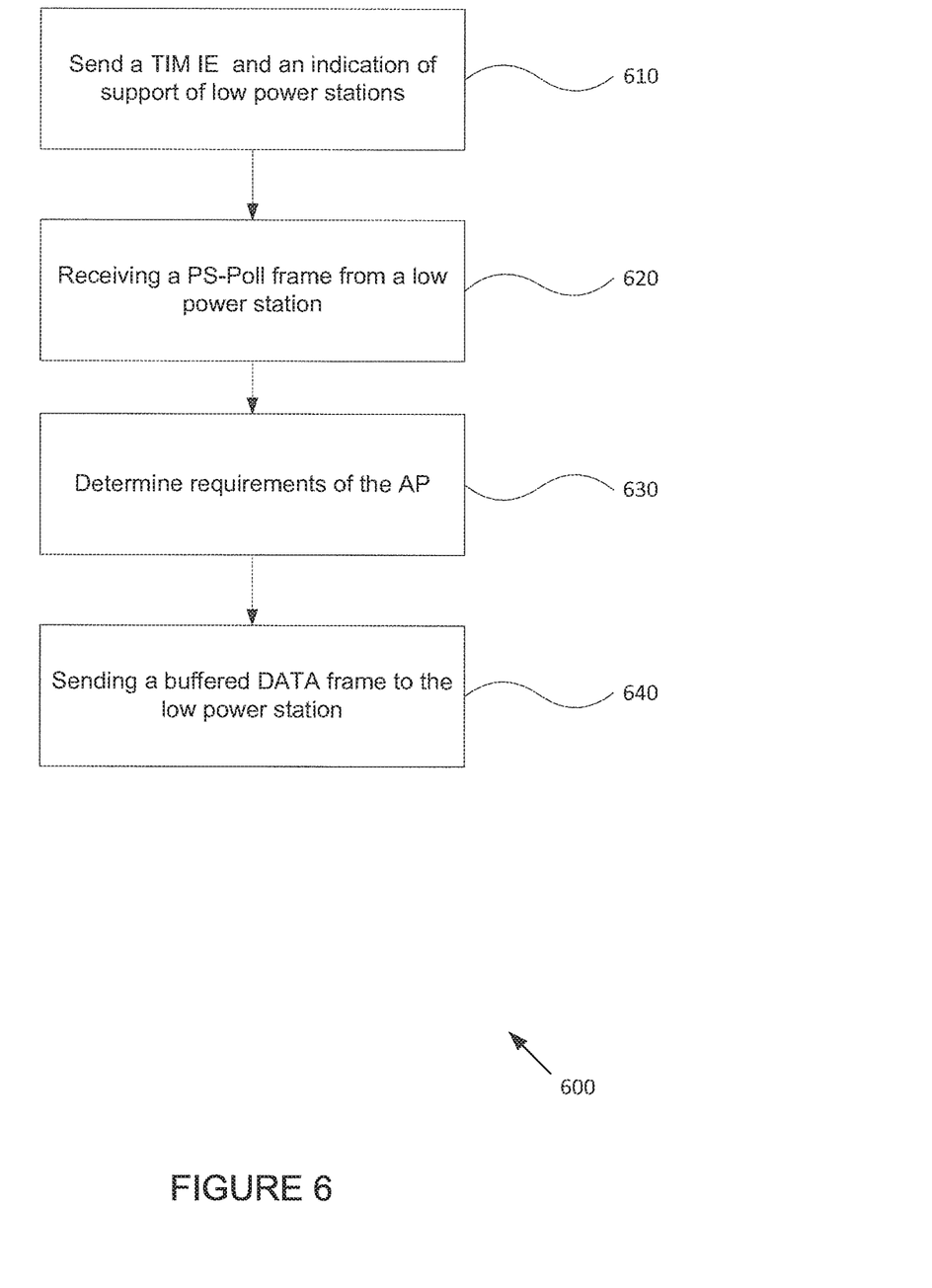

FIG. 5 depicts a process or method 500 executed within a STA 120 for implementing a low power, power efficient PS-Poll. FIG. 6 depicts a process or method 600 executed within an AP for implementing a low power, power efficient PS-Poll. The embodiments of the processes 500 and 600 shown in FIGS. 5 and 6, respectively, are for illustration only. Other embodiments could be used without departing from the scope of this disclosure.

When the power efficient low power STA associates with the AP to join the BSS, the STA knows that the AP supports low power STA operation through the Association Response, and the AP knows that the STA is a power efficient low power STA through the Association Request.

An AP transmits a BEACON frame, which includes a traffic indication map (TIM) information element (IE) in Block 610. Within the BEACON transmission, the AP sends an indication to the power efficient low power STAs 120 that the AP 110 supports power efficient low power STAs (i.e. STAs that implement a power efficient PS-Poll procedure, such as a TXOP power saving procedure). The power efficient low power station 120 is awake during the BEACON transmission to receive the BEACON when the power efficient low power station wants to receive the TIM. Otherwise the power efficient low power station just remains in the doze state during the AP's beacon transmission until the power efficient low power STA decides to send Ps-Poll to ask the AP whether there is buffered traffic in the AP for the STA. The power efficient low power STA receives the TIM IE that is within the BEACON in Block 510. The power efficient low power STA receives the indication that the AP supports TXOP power saving stations in Block 520. In Block 530, in response to receiving the TIM IE in Block 510, the power efficient low power station enters a Doze state.

In certain embodiments, the power efficient low power STA remains awake after receiving the TIM IE to immediately send a PS-Poll to the AP. The power efficient low power STA is awake to send a PS-Poll frame to the AP in Block 540. The STA indicates to the AP that the STA is a power efficient low power station with power efficient PS-Poll capabilities through the association procedure when the STA joins the BSS (e.g., in an Extend Capabilities Information Element within a Probe Request and Association Request). The AP receives the PS-Poll from the power efficient low power STA in block 620. The PS-Poll triggers the AP to send any buffered DATA frames allocated to the power efficient low power station that sent the PS-Poll.

In response to receiving the PS-Poll, the AP determines certain requirements (i.e., actions the AP shall do) in Block 630. When the AP supports power efficient low power STA operation, which implies TXOP power saving operation, in response to receiving a PS-Poll, the AP shall allow TXOP power save in all TXOPs before the AP sends the buffered DATA frame to the power efficient low power STA from which the AP received a PS-Poll. In response to receiving a PS-Poll, the AP shall do one of the following: (1) send a DATA frame to the power efficient low power STA SIFS after receipt of the PS-Poll when the data is ready (sometimes the AP cannot immediately transmit a buffered frame for the STA that sends the PS-Poll); (2) send an ACK to the power efficient low power STA from which the PS-Poll was sent and after a SIFS, send a DATA frame to the low power STA; (3) send an ACK to the power efficient low power STA from which the PS-Poll was sent and, after a SIFS, send a DATA frame to the low power STA; or (4) send an ACK to the power efficient low power STA from which the PS-Poll was sent and, after a PIFS, send a DATA frame to the power efficient low power STA (this DATA frame after ACK gives the AP more time to prepare to transmit the buffered frame to the power efficient low power STA). The AP needs to include an indication in the ACK to the STA when the AP will do (2) or (3).

The power efficient low power STA remains awake after sending the PS-Poll to receive an ACK from the AP. The power efficient low power STA responds to the ACK in Block 550, by remaining in an Awake state or entering a Doze state. When the AP informs the power efficient low power STA that the AP cannot immediately transmit the buffered traffic to the power efficient low power STA through an indication in the ACK, then the power efficient low power STA enters a Doze state 354 in Block 550—e.g., once the STA detects a TXOP that is for another STA. When the AP informs the power efficient low power STA that the AP will immediately transmit the buffered traffic to the STA through the indication in the ACK, then the power efficient low power STA remains awake, awaiting a buffered DATA frame transmission from the AP.

The AP sends buffered DATA to the power efficient low power station in block 640. If the power efficient low power STA is in a Doze state shortly before the AP sends the buffered data, then the power efficient low power STA awakens early enough to receive the DATA frame transmission. The power efficient low power STA, in an Awake state, receives the buffered DATA from the AP in Block 560. In response to receiving the DATA frame, the power efficient low power STA sends an ACK to the AP and then enters a Doze state in Block 570.

It is important to note that while the present disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the processes 500 and 600. Examples of machine usable, machine readable or computer usable, computer readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

It may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "device" means any apparatus, system, machine, thing, item, construct, or any part thereof. The term "controller" means any device or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior uses, as well as future uses, of such defined words and phrases.

While this disclosure has described certain embodiments and generally associated methods, alterations and permutations of these embodiments and methods will be apparent to those skilled in the art. Accordingly, the descriptions of example embodiments do not define or constrain this disclosure. Other changes, substitutions, and alterations are also possible without departing from the spirit and scope of this disclosure, as defined by the following claims.

What is claimed is:

1. A method of reducing the power used by a wireless station, the method comprising:

waking a first wireless station from a doze state to send a PS-Poll frame from the wireless station to an access point;

in response to the PS-Poll frame being received at the access point, receiving at the first wireless station from the access point an acknowledgement frame containing a traffic buffering bit indicating that traffic for the first wireless station is buffered by the access point and that a data frame is available to transmit to the first wireless station;

detecting a frame transmitted by a second wireless station that is not for the first wireless station, the second wireless station being different from the access point, after receiving at the first wireless station from the access point the acknowledgement frame indicating that the data frame is available and before receiving at the first wireless station the data frame transmitted by the access point;

in response to detecting the frame transmitted by the second wireless station that is not for the first wireless station, causing the first wireless station to re-enter the doze state before receiving at the first wireless station the data frame transmitted by the access point;

waking the first wireless station from the doze state a second time; and receiving at the first wireless station the data frame transmitted by the access point.

2. The method of claim 1, further comprising:

receiving, at the first wireless station, before receiving the acknowledgement frame a beacon frame from the access point, the beacon frame including an indication of support for a transmission opportunity power save operation in a specific transmission opportunity.

3. The method of claim 2, wherein the first wireless station re-enters the doze state during the specific transmission opportunity in which a receiver of the frame transmitted by the second wireless station in the specific transmission opportunity is not the first wireless station.

4. The method of claim 2, wherein the first wireless station does not receive the frame transmitted by the access point in the specific transmission opportunity when a receiver of the frame transmitted by the second wireless station is not the first wireless station.

5. The method of claim 1, wherein the first wireless station receives an indication from the access point that the access point supports power efficient low power wireless stations in a basic service set.

6. The method of claim 1, wherein during association, the first wireless station indicates to the access point that the first wireless station is a power efficient low power wireless station.

7. The method of claim 1, wherein waking the first wireless station from the doze state to send the PS-Poll frame from the wireless station to the access point includes waking the first wireless station from the doze state after a beacon signal to send the PS-Poll frame from the wireless station to the access point.

8. The method of claim 1, wherein waking the first wireless station from the doze state the second time includes waking the first wireless station from the doze state the second time within the same beacon cycle.

9. An apparatus that uses reduced power, comprising:

a controller configured to:

wake a first wireless station from a doze state and to send a PS-Poll frame to an access point, in response to the PS-Poll frame being received at the access point, receive at the first wireless station from the access point an acknowledgement frame containing a traffic buffering bit indicating that traffic for the first wireless station is buffered by the access point and that a data frame is available to transmit to the first wireless station, detect a frame transmitted by a second wireless station that is not for the first wireless station, the second wireless station being different from the access point, after the acknowledgement frame indicating that the data frame is available is received and before receiving at the first wireless station the data frame transmitted by the access point;

in response to detecting the frame transmitted by the second wireless station that is not for the first wireless station, cause the first wireless station to re-enter the doze state before receiving at the first wireless station the data frame transmitted by the access point;

wake the first wireless station from the doze state a second time; and receive at the first wireless station the data frame transmitted by the access point.

10. The apparatus of claim 9, wherein the controller is configured to receive, at the first wireless station, before receiving the acknowledgement frame a beacon frame from the access point, the beacon frame including an indication of support for a transmission opportunity power save operation in a specific transmission opportunity.

11. The apparatus of claim 10, wherein the first wireless station re-enters the doze state during the specific transmission opportunity in which a receiver of the frame transmitted by the second wireless station in the specific transmission opportunity is not the first wireless station.

12. The apparatus of claim 10, wherein the first wireless station does not receive the frame transmitted by the access point in the specific transmission opportunity when a receiver of the frame transmitted by the second wireless station is not the first wireless station.

13. The apparatus of claim 9, wherein the first wireless station receives an indication from the access point that the access point supports power efficient low power wireless stations in a basic service set.

14. The apparatus of claim 9, wherein the controller is configured, during association, to indicate to the access point that the first wireless station is a power efficient low power wireless station.

15. The apparatus of claim 9, wherein the controller is configured to wake the first wireless station from the doze state after a beacon signal to send the PS-Poll frame from the wireless station to the access point.

16. The apparatus of claim 9, wherein the controller is configured to wake the first wireless station from the doze state the second time within the same beacon cycle.

17. A method that reduces the power used by a wireless station, the method, the method comprising:

after receiving an indication that a first wireless station is a power efficient low power wireless station, receiving a PS-Poll frame from the first wireless station at an access point;

in response to receiving the PS-Poll, transmitting to the first wireless station from the access point an acknowledgement frame containing a traffic buffering bit indicating that traffic for the first wireless station is buffered by the access point and that a data frame containing buffered data for the first wireless station is available to transmit;

after transmitting to the first wireless station from the access point the acknowledgement frame indicating that the data frame containing buffered data for the first wireless station is available and before transmitting to the first wireless station from the access point the data frame containing buffered data for the first wireless station, receiving a data frame transmitted by a second wireless station at the access point, the second wireless station being different from the first wireless station;

in response to receiving the data frame transmitted by the second wireless station at the access point, transmitting to the second wireless station from the access point an acknowledgement frame; and after transmitting to the second wireless station from the access point the acknowledgement frame, transmitting to the first wireless station from the access point the data frame containing buffered data for the first wireless station.

18. The method of claim 17, wherein the first wireless station enters a doze state upon determining that the frame transmitted by the second wireless station is not for the first wireless station.

19. The method of claim 18, wherein the first wireless station enters the doze state after transmitting an acknowledgement frame from the first wireless station to the access point that acknowledges the received data frame.

20. The method of claim 17, wherein, during association, the access point indicates that the access point supports power efficient low power wireless stations in a basic service set.

21. The method of claim 17, during association, the access point receives an indication that the first wireless station is a power efficient low power wireless station.

22. The method of claim 17, further comprising:
transmitting a beacon signal before receiving the indication that the first wireless station is the power efficient low power wireless station.

23. An apparatus that reduces the power used by a wireless station, the apparatus comprising:
a controller configured to:
after receiving an indication that a first wireless station is a power efficient low power wireless station, receive a PS-Poll frame from the first wireless station at an access point,
in response to receiving the PS-Poll, transmit to the first wireless station from the access point an acknowledgement frame containing a traffic buffering bit indicating that traffic for the first wireless station is buffered by the access point and that a data frame containing buffered data for the first wireless station is available to transmit;
after transmitting to the first wireless station from the access point the acknowledgement frame indicating that the data frame containing buffered data for the first wireless station is available and before transmitting to the first wireless station from the access point the data frame containing buffered data for the first wireless station, receive a data frame transmitted by a second wireless station at the access point, the second wireless station being different from the first wireless station;
in response to receiving the data frame transmitted by the second wireless station at the access point, transmit to the second wireless station from the access point an acknowledgement frame; and
after transmitting to the second wireless station from the access point the acknowledgement frame, transmit to the first wireless station a data frame containing buffered data for the first wireless station.

24. The apparatus of claim 23, wherein the first wireless station enters a doze state upon determining that the frame transmitted by the second wireless station is not for the first wireless station.

25. The apparatus of claim 24, wherein the first wireless station enters the doze state after transmitting an acknowledgement frame from the first wireless station to the access point that acknowledges the received data frame.

26. The apparatus of claim 23, wherein, wherein the controller is configured to indicate, during association, that the access point supports power efficient low power wireless stations in a basic service set.

27. The apparatus of claim 23, wherein the controller is configured, during association, to receive an indication that the first wireless station is a power efficient low power wireless station.

28. The apparatus of claim 23, wherein the controller is configured to transmit a beacon signal before receiving the indication that the first wireless station is the power efficient low power wireless station.

* * * * *

UNITED STATES PATENT AND TRADEMARK OFFICE
CERTIFICATE OF CORRECTION

PATENT NO. : 9,544,847 B2  Page 1 of 1
APPLICATION NO. : 15/213107
DATED : January 10, 2017
INVENTOR(S) : Liwen Chu et al.

It is certified that error appears in the above-identified patent and that said Letters Patent is hereby corrected as shown below:

On the Title Page

Item (56):
"Calcev et al., "Non-TIM Stations in 1 1ah," *IEEE 11-12-0610-00-00ah*, May 2012, 11 pages."
should read, --Calcev et al., "Non-TIM Stations in 11ah," IEEE *11-12-0610-00-00ah*, May 2012, 11 pages.--.

Signed and Sealed this
Eleventh Day of April, 2017

Michelle K. Lee
*Director of the United States Patent and Trademark Office*